(12) United States Patent
White

(10) Patent No.: US 6,691,550 B2
(45) Date of Patent: Feb. 17, 2004

(54) ESTIMATOR FOR DETERMINING RESONANT FREQUENCY AND Q

(75) Inventor: Stanley A. White, San Clemente, CA (US)

(73) Assignee: Honeywell International, Inc., Morristown, NJ (US)

( * ) Notice: Subject to any disclaimer, the term of this patent is extended or adjusted under 35 U.S.C. 154(b) by 149 days.

(21) Appl. No.: 09/978,321

(22) Filed: Oct. 16, 2001

(65) Prior Publication Data

US 2003/0089157 A1 May 15, 2003

(51) Int. Cl.[7] ............................................... G01C 17/38
(52) U.S. Cl. ....................................................... 73/1.77
(58) Field of Search .................................. 73/1.38, 1.77, 73/579; 702/33, 56, 127, 189, 199

(56) References Cited

U.S. PATENT DOCUMENTS

| 4,709,357 A | * | 11/1987 | Maki, Jr. |
| RE32,931 E | | 5/1989 | Staudte |
| 5,056,366 A | | 10/1991 | Fersht et al. |
| 5,629,489 A | * | 5/1997 | Hipkiss et al. |

* cited by examiner

*Primary Examiner*—Robert Raevis
(74) *Attorney, Agent, or Firm*—Schiff Hardin & Waite

(57) ABSTRACT

The resonant frequency of a device is determined by energizing the device with a short burst of energy to produce a decaying sinusoidal output, determining coefficients of a linear difference equation characterizing the decaying sinusoidal output by use of a least-mean-square fit, and determining the resonant frequency from the coefficients. The Q of the device can be determined from a decay parameter of the envelope of the decaying sinusoidal output and from the resonant frequency.

50 Claims, 2 Drawing Sheets

US 6,691,550 B2

ESTIMATOR FOR DETERMINING RESONANT FREQUENCY AND Q

TECHNICAL FIELD OF THE INVENTION

The present invention relates to the determination of the resonant frequency and/or Q of a device such as a gyro.

BACKGROUND OF THE INVENTION

Angular rate sensors are used as components of navigational and inertial guidance systems for aircraft, spacecraft, ships, missiles, etc. Although mechanical gyroscopes have been used in the past for angular rate sensing, ring laser gyros and vibrating quartz gyros have displaced mechanical gyros because ring laser gyros and vibrating quartz gyros have characteristics that are superior to those of mechanical gyros.

A particularly economical vibrating quartz gyro employs pairs of parallel tines. Such a quartz gyro is described, for example, in Fersht et al., U.S. Pat. No. 5,056,366 and in Staudte, U.S. Pat. No. Re 32,931. One pair of tines (the drive tines) is driven by an oscillator so that the tines move toward and away from each other. Rotational motion of the tines about a central longitudinal axis causes the vibration of the drive tines to couple, by coriolis force, to the other pair of tines (the pick-off tines). The coriolis force causes the pick-off tines to vibrate in such a way that, when one pick-off tine moves in one direction, another pick-off tine moves in the opposite direction. The force, which drives the pick-off tines, is proportional to the cross product of the angular rate of rotation and the linear velocity of the drive tines.

The angular rate of rotation of the quartz gyro about the sensing axis appears as a double-sideband suppressed-carrier (DSSC) modulation of the input angular rate, where the carrier frequency is the frequency of oscillation of the drive tines. Therefore, an angular-rate signal can be recovered from the pick-off signal by a synchronous demodulator.

Analog circuits have been used for exciting the quartz gyro and for synchronous demodulation of the pick-off signal. Analog circuits, however, are subject to voltage offsets and drift of component values due to temperature variations and aging. These problems are particularly troublesome due to the peculiarities of the quartz gyro that are not apparent from the simplified or "first order" operating characteristics of the gyro. One problem is related to the resonant frequencies of the drive tines and the pick-off tines. On the one hand, it is undesirable for the pick-off tines to have the same resonant frequency as the drive tines because of the difficulty of removing the dynamics of the pick-off tines from the pick-off signal. That is, if the pick-off tines have the same resonant frequency as the drive tines, the angular-rate signal would be a very non-linear function of the angular rate. On the other hand, the resonant frequency of the pick-off tines must be tuned relatively closely to the resonant frequency of the drive tines, or else the dynamic range of the angular-rate signal is limited by noise. Therefore, some resonant frequency offset between the drive tines and the pick-off tines is desirable.

A typical quartz gyro for inertial navigation applications, for example, has a drive resonant frequency of about 10 kilohertz, a Q of about 18,000, and a difference of about 100 Hz between the drive resonant frequency and the pick-off resonant frequency. The pick-off tines, for example, have the higher resonant frequency. This difference in resonant frequencies causes the amplitude of the angular-rate signal to be dependent on the frequency as well as on the amplitude of vibration of the drive tines.

As can be seen from the above, the resonant frequency of the gyro is set according to the desired specifications for the gyro. For example, it is known to set the resonant frequency of a gyro by laser trimming the tines until the desired resonant frequency is attained. It is helpful to the setting of the resonant frequency of a gyro for the resonant frequency and Q of the gyro to be quickly and accurately determined.

The present invention is directed to an arrangement for permitting the resonant frequency and Q of a gyro to be determined.

SUMMARY OF THE INVENTION

In accordance with one aspect of the present invention, a method of determining a resonant frequency of a device comprises the following: energizing the device with a short burst of energy to produce a decaying sinusoidal output; determining coefficients of a linear difference equation characterizing the decaying sinusoidal output by use of a least-mean-square fit; and, determining the resonant frequency from the coefficients.

In accordance with another aspect of the present invention, a method comprises the following: delaying an input by one sample period to produce a first delayed quantity; delaying the input by two sample periods to produce a second delayed quantity; squaring the second delayed quantity; averaging the squared second delayed quantity to produce a first output $P_0$; multiplying the first and second delayed quantities to produce a first product; averaging the first product to produce a second output $P_1$; squaring the first delayed quantity; subtracting a square of a first sample of the input from the squared first delayed quantity to form a first difference; dividing the first difference by a total number of samples of the input to produce a first result; adding the first output $P_0$ to the first result to produce a third output $P_2$; multiplying the input and the first delayed quantity to produce a second product; subtracting a product of the first sample and a second sample of the input from the second product to form a second difference; dividing the second difference by the total number of samples of the input to produce a second result; adding the second output $P_1$ to the second result to produce a fourth output $R_0$; multiplying the input and the second delayed quantity to produce a third product; averaging the third product to produce a fifth output $R_1$; and, determining a resonant frequency f of a device providing the input based upon the first, second, third, fourth, and fifth outputs.

In accordance with still another aspect of the present invention, a method comprises the following: delaying an input by one sample period to produce a first delayed quantity; delaying the input by two sample periods to produce a second delayed quantity; squaring the second delayed quantity; averaging the squared second delayed quantity to produce $P_0$; combining an expected value $S_0$ of the square of a noise sample with $P_0$ to produce a first output $P'_0$; multiplying the first and second delayed quantities to produce a first product; averaging the first product to produce $P_1$; combining an expected value $S_1$ of a product of two adjacent noise samples with $P_1$ to produce a second output $P'_1$; squaring the first delayed quantity; subtracting a square of a first sample of the input from the squared first delayed quantity to form a first difference; dividing the first difference by a total number of samples of the input to produce a first result; adding the first output $P'_0$ to the first result to produce a third output $P'_2$; multiplying the input and the first delayed quantity to produce a second product; subtracting a product of the first sample and a second sample of the input from the second product to form a second difference; dividing the second difference by the total number of samples of the input to produce a second result; adding the second output $P'_1$ to the second result to produce a fourth output $R'_0$; multiplying the input and the second delayed quantity to produce a third product; averaging the third product to produce $R_1$; combining an expected value $S_2$ of a product of two noise samples separated by one sampling period with $R_1$ to produce a fifth output $R'_1$; and, determining a resonant frequency f of a device providing the input based upon the first, second, third, fourth, and fifth outputs.

In accordance with yet another aspect of the present invention, a method of determining a resonant frequency of a gyro comprises the following: energizing the gyro with a short burst of energy to produce a decaying sinusoidal output from the gyro; sampling the decaying sinusoidal output with a sampling period T to produce samples $x_n$; determining coefficients a and b of a linear difference equation characterizing the decaying sinusoidal output by use of a least-mean-square fit, wherein the linear difference equation has the following form:

$$x_{n+2} + ax_{n+1} + bx_n = 0$$

wherein the least-mean-square fit used to determine the coefficients a and b is in accordance with the following equation:

$$\min_{\hat{a}_m, \hat{b}_m} J_m \text{ where } J_m = \sum_{n=0}^{m} (x_{n+2} + \hat{a}_m x_{n+1} + \hat{b}_m x_n)^2$$

where $\hat{a}_m$ and $\hat{b}_m$ are LMS estimates of coefficients a and b based upon m+2 input samples, and wherein the coefficients a and b of the linear difference equation are estimated by taking a partial derivative of $J_m$ with respect to $\hat{a}_m$ and a partial derivative of $J_m$ with respect to $\hat{b}_m$, by equating both partial derivatives to zero, and by solving for the coefficients $\hat{a}_m$ and $\hat{b}_m$; and, determining the resonant frequency from the estimates of the coefficients a and b.

In accordance with a further aspect of the present invention, a method of determining a resonant frequency f of a gyro comprises the following: energizing the gyro with a short burst of energy to produce a decaying sinusoidal output signal from the gyro; sampling the decaying sinusoidal output signal with a sampling period T to produce samples $x_n$; estimating coefficients a and b of the decaying sinusoidal output signal from the samples $x_n$; and, determining an estimate $\hat{f}_m$ of the resonant frequency f from the estimates of the coefficients a and b according to the following equation:

$$\hat{f}_m = \frac{1}{2\pi T} \cos^{-1}\left(\frac{-\hat{a}_m}{2\sqrt{\hat{b}_m}}\right).$$

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
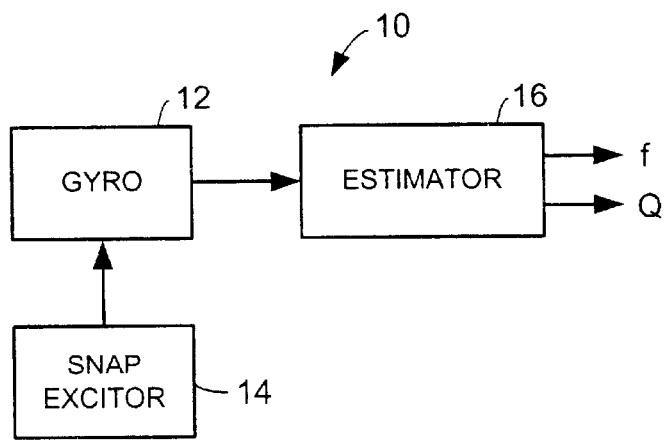
FIG. 1 shows a system for determining the resonant frequency and Q of a gyro.

As shown in FIG. 1, a system 10 determines the resonant frequency and Q of a gyro 12 which is impulse-excited by an electrical snap, i.e., a short burst of electrical energy, supplied by a snap excitor 14. Accordingly, the gyro 12 is excited into vibration and produces a sinusoidal output signal that decays after the electrical snap. This signal is sampled by an estimator 16 that estimates the resonant frequency and Q of the gyro 12 based on the samples.

The samples $x_n$ of a decaying sinusoidal signal may be given by the following equation:

$$x_n = Ae^{-cnT}\sin(2\pi f_0 nT + \theta) \tag{1}$$

where the sampling period is T and n is the sampling time index equal to 0, 1, 2, . . . Equation (1) is a solution to the following unforced linear difference equation:

$$x_{n+2} + ax_{n+1} + bx_n = 0 \tag{2}$$

Values for A and θ in equation (1) are determined by the initial conditions and the following equations:

$$a = -2e^{-cT}\cos(2\pi f_0 T) \tag{3}$$

and $$b = e^{-2cT} \tag{4}$$

In order to estimate the coefficients a and b with $\hat{a}_m$ and $\hat{b}_m$ after m+2 input samples, given the data sequence $x_0$, $x_1$, . . . , $x_{m+2}$, an estimation error criterion $J_m$ to be minimized in the least-mean-square error sense can be defined by the following equation:

$$J_m = \sum_{n=0}^{m} (x_{n+2} + \hat{a}_m \cdot x_{n+1} + \hat{b}_m \cdot x_n)^2 \tag{5}$$

The values for $\hat{a}_m$ and $\hat{b}_m$ which minimize the estimation error $J_m$ can be determined in a least-mean-square error sense in accordance with the following partial derivative equations:

$$\frac{1}{2}\frac{\partial J_m}{\partial \hat{a}_m} = \sum_{n=0}^{m} (x_{n+2} + \hat{a}_m \cdot x_{n+1} + \hat{b}_m \cdot x_n) \cdot x_{n+1} = 0 \tag{6}$$

$$\frac{1}{2}\frac{\partial J_m}{\partial \hat{b}_m} = \sum_{n=0}^{m} (x_{n+2} + \hat{a}_m \cdot x_{n+1} + \hat{b}_m \cdot x_n) \cdot x_n = 0 \tag{7}$$

Equations (6) and (7) can be expanded and re-written in matrix form to produce the following matrix equation:

$$\begin{bmatrix} -\sum_{n=0}^{m} x_{n+1}x_{n+2} \\ -\sum_{n=0}^{m} x_n x_{n+2} \end{bmatrix} = \begin{bmatrix} \sum_{n=0}^{m} x_{n+1}^2 & \sum_{n=0}^{m} x_n x_{n+1} \\ \sum_{n=0}^{m} x_n x_{n+1} & \sum_{n=0}^{m} x_n^2 \end{bmatrix} \begin{bmatrix} a_m \\ b_m \end{bmatrix} \tag{8}$$

The solution for $a_m$ and $b_m$ can then be obtained from the above equation in accordance with the following matrix equation:

$$\begin{bmatrix} a_m \\ b_m \end{bmatrix} = \begin{bmatrix} \sum_{n=0}^{m} x_n^2 & -\sum_{n=0}^{m} x_n x_{n+1} \\ -\sum_{n=0}^{m} x_n x_{n+1} & \sum_{n=0}^{m} x_{n+1}^2 \end{bmatrix} \begin{bmatrix} -\sum_{n=0}^{m} x_{n+1} x_{n+2} \\ -\sum_{n=0}^{m} x_n x_{n+2} \end{bmatrix} \Big/ D_m \qquad (9)$$

In equation (9), $D_m$ is given by the following equation:

$$D_m = \sum_{n=0}^{m} x_n^2 \sum_{n=0}^{m} x_{n+1}^2 - \left(\sum_{n=0}^{m} x_n x_{n+1}\right)^2 \qquad (10)$$

The numerator and the denominator of equation (9) are divided by $(m+1)^2$ to permit the use of conventional correlation definitions, and noise is considered by replacing $x_n$ with $x'_n + \eta_n$ to represent actual conditions, where $\eta_n$ is the noise sample. The effect of dividing the numerator of equation (9) by $(m+1)^2$ may be seen by considering one of the components of equation (9) as given in the following example:

$$\frac{1}{m+1} \sum_{n=0}^{m} x_n^2 = \frac{1}{m+1} \sum_{n=0}^{m} (x'_n + \eta_n)^2 \qquad (11)$$

$$= \frac{1}{m+1} \sum_{n=0}^{m} (x'^2_n + 2x'_n \eta_n + \eta_n^2)$$

If the signal and the noise are uncorrelated, and if the noise is stationary, then the right hand side of equation (11) reduces to the following form:

$$\sigma_0^2 + \frac{1}{m+1} \sum_{n=0}^{m} x'^2_n \qquad (12)$$

where $\sigma_0^2$ is the variance of the noise. Prior to the snap, the expected value of the square of the noise, $S_0$, can be measured and used on line. Similarly, the expected value of the product of two adjacent noise samples $S_1$ and the expected value of the product of two noise samples that are separated by one sample period $S_2$ can also be measured and used, as discussed below.

In order to assist in the mechanization of an estimator to solve for $a_m$ and $b_m$ based upon equation (9), recursive forms for $P_0(m)$, $P_1(m)$, $P_2(m)$, $R_0(m)$, and $R_1(m)$ may be defined in accordance with the following equations:

$$P_0(m) = \frac{1}{m+1} \sum_{n=0}^{m} x_n^2 = P_0(m-1) + \frac{1}{m+1}[x_m^2 - P_0(m-1)] \qquad (13)$$

$$P_1(m) = \frac{1}{m+1} \sum_{n=0}^{m} x_n x_{n+1} = P_1(m-1) + \frac{1}{m+1}[x_m x_{m+1} - P_1(m-1)] \qquad (14)$$

$$P_2(m) = \frac{1}{m+1} \sum_{n=0}^{m} x_{n+1}^2 = P_2(m-1) + \frac{1}{m+1}[x_{m+1}^2 - P_2(m-1)] \qquad (15)$$

$$R_0(m) = \qquad (16)$$
$$\frac{1}{m+1} \sum_{n=0}^{m} x_{n+1} x_{n+2} = R_0(m-1) + \frac{1}{m+1}[x_{m+1} x_{m+2} - R_0(m-1)]$$

$$R_1(m) = \frac{1}{m+1} \sum_{n=0}^{m} x_n x_{n+2} = R_1(m-1) + \frac{1}{m+1}[x_m x_{m+2} - R_1(m-1)] \qquad (17)$$

The appropriate noise samples discussed above may be combined with these equations to produce noise corrected versions as follows:

$$P'_0(m) = P_0(m) - S_0 \qquad (18)$$

$$P'_1(m) = P_1(m) - S_1 \qquad (19)$$

$$P'_2(m) = P_2(m) - S_0 \qquad (20)$$

$$R'_0(m) = R_0(m) - S_1 \qquad (21)$$

$$R'_1(m) = R_1(m) - S_2 \qquad (22)$$

Using these values as defined by equations (13), (14), (15), (16), (17), (18), (19), (20), (21), and (22), equation (10) can be rewritten as follows:

$$D'(m) = P'_0(m) P'_2(m) - [P'_1(m)]^2 \qquad (23)$$

Moreover, given these values as defined by equations (13), (14), (15), (16), (17), (18), (19), (20), (21), (22), and (23), equation (9) can be rewritten according to the following equations:

$$\hat{a}_m = \frac{1}{D'm}[-P'_0(m) R'_0(m) + P'_1(m) R'_1(m)] \qquad (24)$$

$$\hat{b}_m = \frac{1}{D'(m)}[P'_1(m) R'_0(m) - P'_2(m) R'_1(m)] \qquad (25)$$

By combining equations (3) and (4), estimates, $\hat{f}_m$, of the resonant frequency of the gyro 12 may be calculated using the estimates of a and b from equations (24) and (25) in the following equation:

$$\hat{f}_m = \frac{1}{2\pi T} \cos^{-1}\left(\frac{-\hat{a}_m}{2\sqrt{\hat{b}_m}}\right). \qquad (26)$$

The elemental Hilbert transformer has input $x_n$, an "in phase" output $u_n = x_{n-1}$ and a quadrature output $v_n = K(x_n - x_{n-2})$. If $u_n = \sin(2\pi f_0 nT)$, then $v_n = K[2\sin(2\pi f_0 T)]\cos(2\pi f_0 nT)$, because $x_n = \sin[2\pi f_0(n+1)T] = \sin(2\pi f_0 nT + 2\pi f_0 T)$ and $x_{n-2} = \sin[(2\pi f_0(n-1)T] = \sin(2\pi f_0 nT - 2\pi f_0 T)$, and because $x_n - x_{n-2} = \sin(2\pi f_0 nT + 2\pi f_0 T) - \sin(2\pi f_0 nT - 2\pi f_0 T) = \sin(2\pi f_0 nT)\cos(2\pi f_0 T) + \cos(2\pi f_0 nT)\sin(2\pi f_0 T) - \sin(2\pi f_0 nT)\cos(2\pi f_0 T) + \cos(2\pi f_0 nT)\sin(2\pi f_0 T) = 2\cos(2\pi f_0 nT)\sin(2\pi f_0 T)$. If the gains of the in-phase ($u_n$) and quadrature ($v_n$) channels are to be matched, K must be set to a value given by the following equation:

$$K = \frac{1}{2\sin(2\pi f_0 T)} \qquad (27)$$

The amplitude A of the input signal can be measured and is given by the following equation:

$$A^2 = u_n^2 + v_n^2 \qquad (28)$$

If the amplitude envelope of the input signal is a decaying exponential given by the following equation:

$$r^n = e^{-cnT} \qquad (29)$$

the estimate of the square of the input signal is noisy unless compensation is provided for the delay. One possible estimate for the envelope is given by the following equation:

$$y_n = [K(x_n - r^2 x_{n-2})]^2 + (rx_{n-1})^2 \quad (30)$$

which can be re-written according to the following equation:

$$y_n = K^2(x_n - r^2 x_{n-2})^2 + r^2 x_{n-1}^2 \quad (31)$$

From the definition provided by equation (4), it can be seen that $r^2 = b$. Also, from equations (3), (4), and (27), it can be shown that $K^2 = b/(4b-a^2)$. Because only the estimates of a and b are available, the solution for K can be mechanized according to the following equation:

$$K_m^2 = \frac{\hat{b}_m}{4\hat{b}_m - \hat{a}_m^2} \quad (32)$$

In order to simplify the mechanism for implementing a resonant frequency estimator, the value for $P_2(m)$ can be expanded in accordance with the following equation:

$$P_2(m) = \frac{1}{m+1} \sum_{n=0}^{m} x_{n+1}^2 = \frac{1}{m+1} \left[ \sum_{n=0}^{m} x_n^2 - x_0^2 + x_{m+1}^2 \right] \quad (33)$$

and then equations (13) and (33) can be combined in accordance with the following equation:

$$P_2(m) = P_0(m) + \frac{1}{m+1}(x_{m+1}^2 - x_0^2) \quad (34)$$

Similarly, in order to further simplify the mechanism for implementing a resonant frequency estimator, the value for $R_0(m)$ can be expanded in accordance with the following equation:

$$R_0(m) = \frac{1}{m+1} \sum_{n=0}^{m} x_{n+1} x_{n+2} \quad (35)$$

$$= \frac{1}{m+1} \left[ \sum_{n=0}^{m} x_n x_{n+1} - x_0 x_1 + x_{m+1} x_{m+2} \right]$$

and then equations (14) and (35) can be combined in accordance with the following equation:

$$R_0(m) = P_1(m) + \frac{1}{m+1}(x_{m+1} x_{m+2} - x_0 x_1) \quad (36)$$

Figure 2:
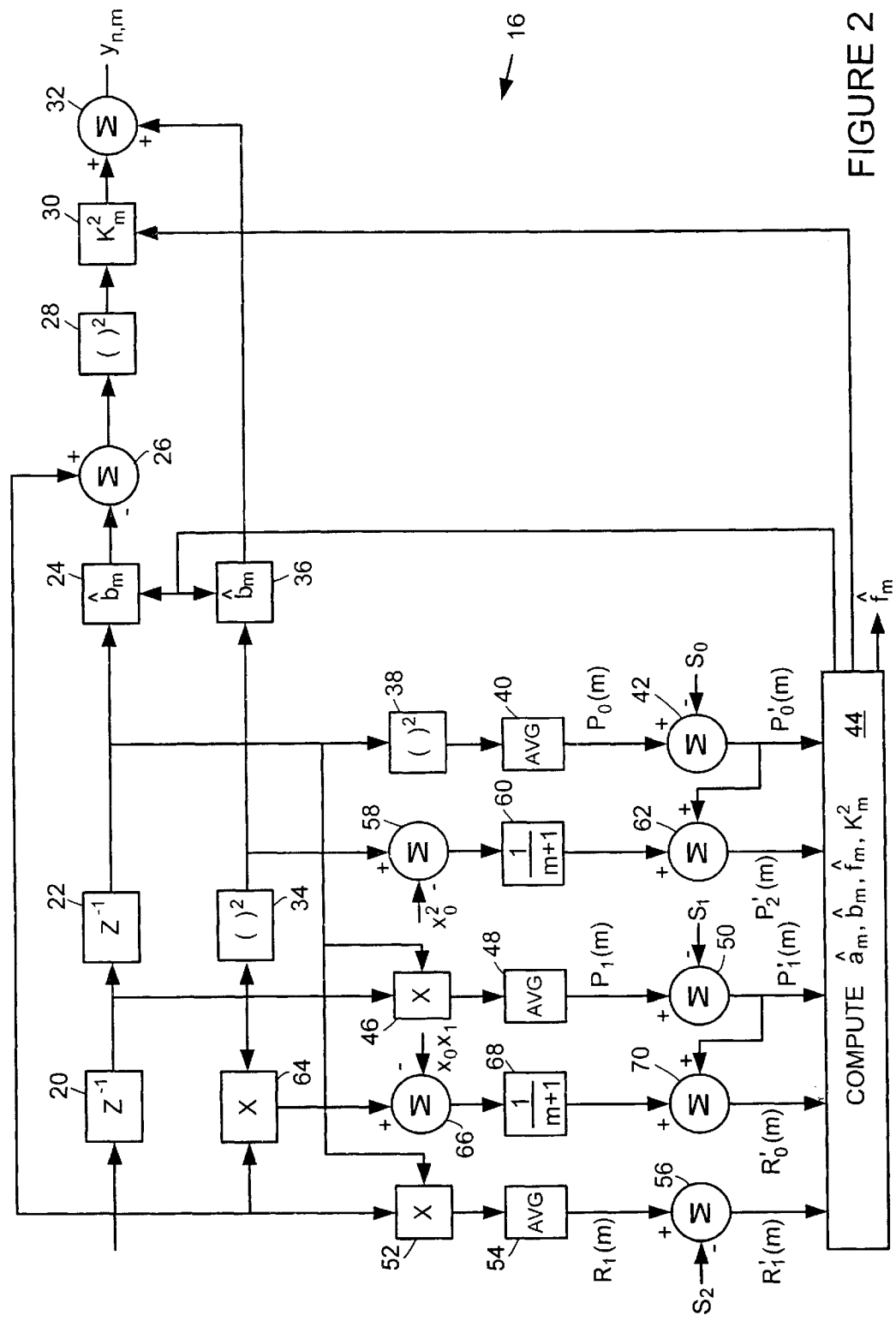
FIG. 2 shows an exemplary embodiment of an estimator according to one embodiment of the present invention that may be used in the system shown in FIG. 1.

As shown in FIG. 2, the estimator 16 is implemented in accordance with this analysis. Thus, a first single-sample-period delay element 20 receives the samples based upon the output of the gyro 12, and the output of the first single-sample-period delay element 20 is coupled to a second single-sample-period delay element 22. The initial condition of each of the first and second single-sample-period delay elements 20 and 22 is 0. The output of the second single-sample-period delay element 22 is coupled to a gain element 24 that applies a gain of $b_m$ to the output of the second single-sample-period delay element 22. The input to the first single-sample-period delay element 20 is applied to a positive input of a summer 26, and the output of the gain element 24 is applied to a negative output of the summer 26. The first single-sample-period delay element 20, the second single-sample-period delay element 22, and the summer 26 form the elemental Hilbert transformer discussed above.

The output of the summer 26, which is the quadrature output of the Hilbert transformer, is coupled to a squaring element 28 whose output is coupled to a gain element 30 that applies a gain of $K_m^2$ to the output of the squaring element 28. The output of the gain element 30 is coupled to a first positive input of a summer 32 whose output is designated $y_n$.

The output of the first single-sample-period delay element 20, which is the in-phase output of the Hilbert transformer, is coupled to a squaring element 34 whose output is coupled to a gain element 36. The gain element 36 applies a gain of $\hat{b}_m$ to the output of the squaring element 34. The output of the gain element 36 is coupled to a second positive input of the summer 32.

Accordingly, the first single-sample-period delay element 20, the second single-sample-period delay element 22, the gain element 24, the summer 26, the squaring element 28, the gain element 30, the summer 32, the squaring element 34, and the gain element 36 implement equation (31).

The output of the second single-sample-period delay element 22 is coupled to a squaring element 38 whose output is coupled to an averaging element 40. The squaring element 38 and the averaging element 40 implement equation (13). As discussed above, noise is likely to occur and it can be sampled. Accordingly, $S_0$, which is the expected noise value of the square of a noise sample, is coupled to a negative input of a summer 42 whose positive input is coupled to the output of averaging element 40. Thus, the summer 42 combines the expected noise value $S_0$ with the output of the averaging element 40 in accordance with equation (18). The output of the summer 42 is designated $P'_0(m)$ and is coupled to a processor 44.

The output of the first single-sample-period delay element 20 is coupled a first input of a multiplier 46 which has a second input coupled to the output of the second single-sample-period delay element 22. The output of the multiplier 46 is coupled to an averaging element 48. The multiplier 46 and the averaging element 48 implement equation (14). The expected noise value $S_1$ of a product of two adjacent noise samples is coupled to a negative input of a summer 50 whose positive input is coupled to the output of the averaging element 48. Accordingly, the summer 50 combines the expected noise value $S_1$ with the output of the averaging element 48 in accordance with equation (19). The output of the summer 50 is designated $P'_1(m)$ and is coupled to the processor 44.

The input to the first single-sample-period delay element 20 is coupled a first input of a multiplier 52 which has a second input coupled to the output of the second single-sample-period delay element 22. The output of the multiplier 52 is coupled to an averaging element 54. The multiplier 52 and the averaging element 54 implement equation (17). The expected noise value $S_2$ of a product of two noise samples separated by one sampling period is coupled to a negative input of a summer 56 whose positive input is coupled to the output of the averaging element 54. Accordingly, the summer 56 combines the expected noise value $S_2$ with the output of the averaging element 54 in accordance with equation (22). The output of the summer 56 is designated $R'_1(m)$ and is coupled to the processor 44.

The output of the squaring element 34 is coupled to a positive input of a summer 58 which has a negative input receiving the quantity $x_0^2$, where $x_0$ is the first sample processed by the estimator 16. A gain element 60 applies a gain of $1/(m+1)$ to the output of the summer 58. The summer 58 and the gain element 60 implement a portion of equation (34). The output of the gain element 60 is coupled to a first positive input of a summer 62 which has a second positive input coupled to the output of the summer 42 in order to implement the rest of equation (34) as well as equation (20). The output of the summer 62 is designated $P'_2(m)$ and is coupled to the processor 44.

The input to the first single-sample-period delay element 20 is coupled a first input of a multiplier 64 which has a second input coupled to the output of the first single-sample-period delay element 20. The output of the multiplier 64 is coupled to a positive input of a summer 66 which has a negative input receiving the quantity $x_0 x_1$, where $x_0$ and $x_1$ are the first and second samples processed by the estimator 16. A gain element 68 applies a gain of $1/(m+1)$ to the output of the summer 66. The multiplier 64, the summer 66, and the gain element 68 implement a portion of equation (36). The output of the gain element 68 is coupled to a first positive input of a summer 70 which has a second positive input coupled to the output of the summer 50 in order to implement the rest of equation (36) as well as equation (21). The output of the summer 70 is designated $R'_0(m)$ and is coupled to the processor 44.

The processor 44 uses the inputs $P'_0(m)$, $P'_1(m)$, $P'_2(m)$, $R'_0(m)$, and $R'_1(m)$ as shown in order to determine estimated values for the coefficients a and b in accordance with equations (23), (24), and (25). Based upon these estimated values for a and b, the processor 44 then estimates the resonant frequency of the gyro 12 based upon equation (26) and a value for $K_m^2$ based upon equation (32). The processor 44 supplies the estimates for the coefficient b to the gain elements 24 and 36 and supplies the value for $K_m^2$ to the gain element 30. The estimate of the resonant frequency of the gyro 12 is also provided as an output of the processor 44.

A least-mean-square straight-line fit can be applied to the natural log of the envelope given by equation (31) in order to determine the decay parameter c of the envelope. Thus, after the transients are gone, the output of the envelope detector is $y_n$ which is given by the following equation:

$$y_n = A_0 e^{-2cnT} \quad (37)$$

If $Y_n$ is designated as the natural log of $y_n$, then $Y_n$ given by the following equation:

$$Y_n = \ln(y_n) = \ln(A_0) - 2cnT \cong p_n + nq_n \quad (38)$$

The approximation error at the $n^{th}$ point is given by the following equation:

$$e_n = Y_n - p_n - nq_n \quad (39)$$

Values for $p_n$ and $q_n$ can be obtained by minimizing the sum-squared error $E_m$ based on samples up through the $m^{th}$ sample. Therefore, $E_m$ is given by the following equation:

$$E_m = \sum_{n=0}^{m} e_n^2 \quad (40)$$

In order to solve for q, partial derivatives of equations (40) are taken in accordance with the following equations, the partial derivatives are set to zero, and the resulting equations are solved for q:

$$\frac{\partial E_m}{\partial p_m} = 2 \sum_{n=0}^{m} e_n \frac{\partial e_n}{\partial p_m} = 2 \sum_{n=0}^{m} (Y_n - p_n - nq_n)(-1) = 0 \quad (41)$$

$$\frac{\partial E_m}{\partial q_m} = 2 \sum_{n=0}^{m} e_n \frac{\partial e_n}{\partial q_m} = 2 \sum_{n=0}^{m} (Y_n - p_n - nq_n)(-q_n) = 0 \quad (42)$$

From equations (41) and (42), $q_m$ is given by the following equation:

$$q_m = \frac{12}{m(m+1)(m+2)} \left[ \sum_{n=0}^{m} n Y_n - \frac{m}{2} \sum_{n=0}^{m} Y_n \right] \quad (43)$$

$$= \frac{6}{m(m+2)} [2J_m - m I_m]$$

where $I_m$ and $J_m$ are given by the following equations:

$$I_m = \frac{1}{(m+1)} \sum_{n=0}^{m} Y_n \quad (44)$$

$$J_m = \frac{1}{(m+1)} \sum_{n=0}^{m} n Y_n \quad (45)$$

The $m^{th}$ estimate of the decay parameter c in equation (37) is obtained from equation (38) and is given by the following equation:

$$\hat{c}_m = -\frac{q_m}{2T} \quad (46)$$

Accordingly, equations (43) and (46) can be combined to produce a fresh estimate of the decay parameter c after the $m^{th}$ sample according to the following equation:

$$\hat{c}_m = \frac{3}{Tm(m+2)} (m I_m - 2 J_m) \quad (47)$$

The estimated decay parameter $\hat{c}_m$ can be converted to a running estimate where m=n in order to produce a fresh estimate of the decay parameter c at each clock time greater than zero according to the following equation:

$$\hat{c}_n = \frac{3}{Tn(n+2)} (n I_n - 2 J_n) \quad (48)$$

A sample to sample updated running evaluation of $I_n$ and $J_n$ can be computed in accordance with the following equations:

$$I_n = I_{n-1} + \frac{1}{n+1} (Y_n - I_{n-1}) \text{ for } n > 0 \text{ and } I_0 = Y_0 \quad (49)$$

$$J_n = J_{n-1} + \frac{1}{n+1} (n Y_n - J_{n-1}) \text{ for } n \geq 0 \quad (50)$$

Figure 4:
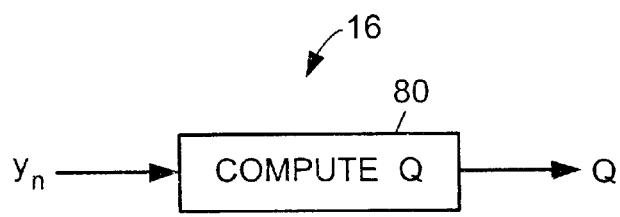

Thus, as shown in FIG. 4, a processor 80 of the estimator 16 may be arranged to determine $\hat{c}_m$ based upon equations (48), (49), and (50) and the following equation:

$$Y_n = \ln(y_n) \quad (51)$$

which is the first part of equation (38). Based upon this value of $\hat{c}_m$, the processor 80 estimates the Q of the gyro 12 in accordance with the following equation:

$$\hat{Q}_m = \pi \frac{\hat{f}_m}{\hat{c}_m} \quad (52)$$

Therefore, based upon the resonant frequency $\hat{f}_m$ and the decay parameter $\hat{c}_m$, the Q for the gyro 12 may be easily determined by equation (52).

Figure 3:
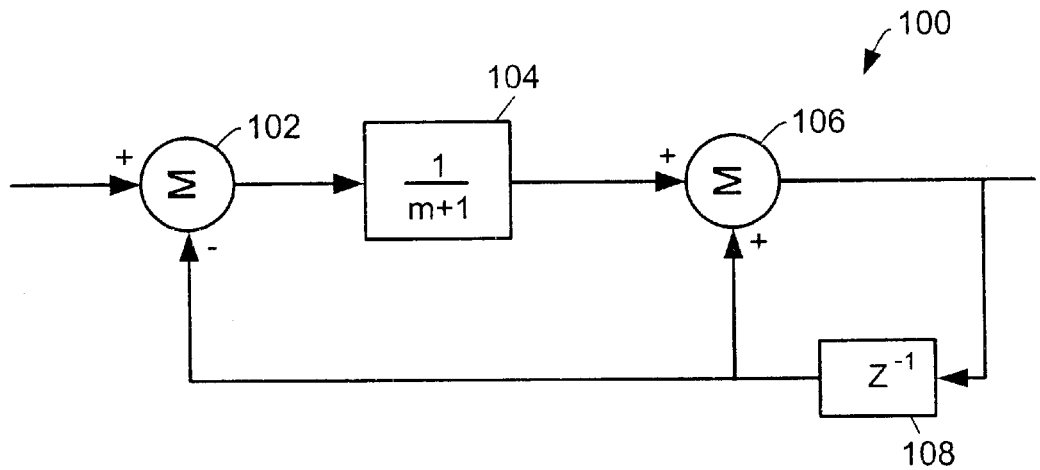
FIG. 3 shows an averager that may be used in connection with the estimator shown in FIG. 1; and, FIG. 4 shows a processing portion of the estimator shown in FIG. 2 for estimating the Q of the gyro shown in FIG. 1.

An averaging element 100 is shown in FIG. 3 and may be used for each of the averaging elements 40, 48, and 52 shown in FIG. 2. The averaging element 100 includes a summer 102 having a positive input that receives the input to the averaging element 100. An output of the summer 102 is coupled to a gain element 104 that applies a gain of 1/(m+1) to the output of the summer 102. The output of the gain element 104 is coupled to a first positive output of a summer 106 whose output forms the output of the averaging element 100. The output of the summer 106 is coupled to an input of a single-sample-period delay element 108 whose output is coupled to a negative input of the summer 102 and to a second positive input of the summer 106, and whose initial input condition is 0.

Certain modifications of the present invention have been discussed above. Other modifications will occur to those practicing in the art of the present invention. For example, the estimator 16 and the averaging element 100 may be implemented by hardware, software, firmware, digital signal processors, logic arrays, and other suitable mechanisms.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of determining a resonant frequency f of a device comprising:

energizing the device with a short burst of energy to produce a decaying sinusoidal output;

determining coefficients of a linear difference equation characterizing the decaying sinusoidal output by use of a least-mean-square fit;

determining the resonant frequency from the coefficients;

determining an envelope of the decaying sinusoidal output based on the coefficients;

estimating a decay parameter c of the envelope; and, estimating a Q of the device based upon the following equation:

$$Q = \pi \frac{f}{c}.$$

2. The method of claim 1 wherein the linear difference equation is in the following form:

$$x_{n+2} + ax_{n+1} + bx_n = 0$$

wherein $x_n$, $x_{n+1}$, and $x_{n+2}$ are samples of the decaying sinusoidal output, and wherein the coefficients are a and b.

3. The method of claim 2 wherein the least-mean-square fit used to determine the $m^{th}$ estimate of the coefficients a and b by $\hat{a}_m$ and $\hat{b}_m$ is in accordance with minimizing $J_m$ given by the following equation:

$$J_m = \sum_{n=0}^{m} (x_{n+2} + \hat{a}_m x_{n+1} + \hat{b}_m x_n)^2.$$

4. The method of claim 3 wherein the estimation of the coefficients comprises:

determining a partial derivative of $J_m$ with respect to $\hat{a}_m$;

determining a partial derivative of $J_m$ with respect to $\hat{b}_m$;

equating the two partial derivatives to zero; and, solving the two equations for the coefficients $\hat{a}_m$ and $\hat{b}_m$.

5. The method of claim 4 wherein the determination of the $m^{th}$ estimate of the resonant frequency comprises estimating the resonant frequency in accordance with the following equation:

$$\hat{f}_m = \frac{1}{2\pi T} \cos^{-1}\left(\frac{-\hat{a}_m}{2 \cdot \sqrt{\hat{b}_m}}\right)$$

wherein $$\hat{f}_m$$

is the $m^{th}$ estimate of the resonant frequency based upon m+2 consecutive input data samples used to compute $\hat{a}_m$ and $\hat{b}_m$, and wherein T is a sampling period.

6. The method of claim 1 wherein an $m^{th}$ estimate of the resonant frequency is designated $$\hat{f}_m;$$

wherein the estimating of the decay parameter c comprises:

forming a natural logarithm of the envelope; and, estimating a decay parameter c wherein the $m^{th}$ estimate is $\hat{c}_m$ based on a least-mean-square fit of the natural logarithm of the envelope; and, wherein the estimating of a Q comprises estimating a Q of the device where $\hat{Q}_m$ is the $m^{th}$ estimate based upon the following equation:

$$\hat{Q}_m = \pi \cdot \frac{\hat{f}_m}{\hat{c}_m}.$$

7. The method of claim 6 wherein the envelope of the decaying sinusoidal output is given by the following equation:

$$y_{n,m} = \frac{\hat{b}_m}{4\hat{b}_m - \hat{a}_m^2}(x_n - \hat{b}_m x_{n-2})^2 + \hat{b}_m x_{n-1}^2$$

wherein $y_{n,m}$ is the $n^{th}$ sample of the envelope of the decaying sinusoidal output when the $m^{th}$ set of $\hat{a}_m$ and $\hat{b}_m$ parameter estimates are used in the envelope generation, wherein $x_n$, $x_{n-1}$, and $x_{n+2}$ are samples of the decaying sinusoidal output, and wherein a and b are the coefficients of the linear difference equation.

8. The method of claim 6 wherein the linear difference equation is in the following form:

$$x_n + ax_{n-1} + bx_{n-2} = 0$$

wherein $x_n$, $x_{n-1}$, and $x_{n-2}$ are samples of the decaying sinusoidal output, and wherein the coefficients of the linear difference equation are a and b.

9. The method of claim 8 wherein the least-mean-square fit used to estimate the coefficients a and b is in accordance with minimizing $J_m$ given by the following expression:

$$J_m = \sum_{n=0}^{m} \left( x_{n+2} + \hat{a}_m x_{n+1} + \hat{b}_m x_n \right)^2.$$

10. The method of claim 9 wherein the determination of the coefficients comprises:
   determining a partial derivative of $J_m$ with respect to $\hat{a}_m$;
   determining a partial derivative of $J_m$ with respect to $\hat{b}_m$;
   setting both the partial derivatives equal to zero; and,
   solving the two resulting equations for the coefficients $\hat{a}_m$ and $\hat{b}_m$.

11. The method of claim 10 wherein the determination of the $m^{th}$ estimate of the resonant frequency comprises estimating the resonant frequency in accordance with the following equation:

$$\hat{f}_m = \frac{1}{2\pi T} \cos^{-1}\left( \frac{-\hat{a}_m}{2 \cdot \sqrt{\hat{b}_m}} \right)$$

wherein $\hat{f}_m$ is the $m^{th}$ estimate of the resonant frequency based upon m+2 consecutive input data samples used to compute $\hat{a}_m$ and $\hat{b}_m$; and wherein T is a sampling period.

12. The method of claim 11 wherein the envelope of the decaying sinusoidal output is given by the following equation:

$$y_{n,m} = \frac{\hat{b}_m}{4\hat{b}_m - \hat{a}_m^2}\left( x_n - \hat{b}_m x_{n-2} \right)^2 + \hat{b}_m x_{n-1}^2$$

wherein $y_{n,m}$ the $n^{th}$ sample of the envelope of the decaying sinusoidal output when the $m^{th}$ set of $\hat{a}_m$ and $\hat{b}_m$ parameter estimates are used in the envelope generation, wherein $x_n$, $x_{n-1}$, and $x_{n-2}$ are samples of the decaying sinusoidal output, and wherein a and b are the coefficients of the linear difference equation.

13. The method of claim 1 wherein the gyro comprises a vibrating quartz gyro.

14. The method of claim 1 wherein the gyro comprises parallel tines.

15. A method comprising:
   delaying an input by one sample period to produce a first delayed quantity;
   delaying the input by two sample periods to produce a second delayed quantity;
   squaring the second delayed quantity;
   averaging the squared second delayed quantity to produce a first output $P_0$;
   multiplying the first and second delayed quantities to produce a first product;
   averaging the first product to produce a second output $P_1$;
   squaring the first delayed quantity;
   subtracting a square of a first sample of the input from the squared first delayed quantity to form a first difference;
   dividing the first difference by a total number of samples of the input to produce a first result;
   adding the first output $P_0$ to the first result to produce a third output $P_2$;
   multiplying the input and the first delayed quantity to produce a second product;
   subtracting a product of the first sample and a second sample of the input from the second product to form a second difference;
   dividing the second difference by the total number of samples of the input to produce a second result;
   adding the second output $P_1$ to the second result to produce a fourth output $R_0$;
   multiplying the input and the second delayed quantity to produce a third product;
   averaging the third product to produce a fifth output $R_1$; and,
   determining a resonant frequency f of a device providing the input based upon the first, second, third, fourth, and fifth outputs.

16. The method of claim 15 wherein the gyro comprises a vibrating quartz gyro.

17. The method of claim 15 wherein the gyro comprises parallel tines.

18. The method of claim 15 wherein the determining of the resonant frequency f comprises:
   determining a coefficient $\hat{a}_m$ according to the following equation:

$$\hat{a}_m = \frac{1}{D_m}[-P_0(m)R_0(m) + P_1(m)R_1(m)];$$

determining a coefficient $\hat{b}_m$ according to the following equation:

$$\hat{b}_m = \frac{1}{D_m}[P_1(m)R_0(m) - P_2(m)R_1(m)];$$

and, determining the resonant frequency f according to the following equation:

$$\hat{f}_m = \frac{1}{2\pi T} \cos^{-1}\left( \frac{-\hat{a}_m}{2 \cdot \sqrt{\hat{b}_m}} \right)$$

wherein $D_m$ is given by the following equation:

$$D_m = P_0(m)P_2(m) - [P_1(m)]^2.$$

19. The method of claim 18 further comprising:
   applying the coefficient $\hat{b}_m$ to the second delayed quantity to produce a sixth output;
   subtracting the sixth output from the input to produce a seventh output;
   squaring the seventh output;
   applying a factor $K_m^2$ to the squared seventh output to produce an eighth output;
   applying the coefficient $\hat{b}_m$ to the squared first delayed quantity to produce a ninth output;
   adding the eighth and ninth outputs to produce an envelope $y_n$;
   estimating a decay parameter c for the envelope $y_n$; and,
   estimating a Q of the device in accordance with the following equation:

$$\hat{Q}_m = \pi \frac{\hat{f}_m}{\hat{c}_m}$$

wherein $\hat{Q}_m$, $\hat{f}_m$, and $\hat{c}_m$ are the $m^{th}$ estimates of Q, frequency f, and decay parameter c, respectively, and wherein $K_m^2$ is determined in accordance with the following equation:

$$K_m^2 = \frac{\hat{b}_m}{4 \cdot \hat{b}_m - \hat{a}_m^2}.$$

20. The method of claim 15 wherein the delaying of the input by two sample periods comprises delaying the first delayed quantity by one sample period to produce the second delayed quantity.

21. The method of claim 15 wherein the first sample comprises an initial sample, and wherein the second sample comprises a sample next following the initial sample.

22. A method comprising:
    delaying an input by one sample period to produce a first delayed quantity;
    delaying the input by two sample periods to produce a second delayed quantity;
    squaring the second delayed quantity;
    averaging the squared second delayed quantity to produce $P_0$;
    combining an expected value $S_0$ of the square of a noise sample with $P_0$ to produce a first output $P'_0$;
    multiplying the first and second delayed quantities to produce a first product;
    averaging the first product to produce $P_1$;
    combining an expected value $S_1$ of a product of two adjacent noise samples with $P_1$ to produce a second output $P'_1$;
    squaring the first delayed quantity;
    subtracting a square of a first sample of the input from the squared first delayed quantity to form a first difference;
    dividing the first difference by a total number of samples of the input to produce a first result;
    adding the first output $P'_0$ to the first result to produce a third output $P'_2$;
    multiplying the input and the first delayed quantity to produce a second product;
    subtracting a product of the first sample and a second sample of the input from the second product to form a second difference;
    dividing the second difference by the total number of samples of the input to produce a second result;
    adding the second output $P'_1$ to the second result to produce a fourth output $R'_0$;
    multiplying the input and the second delayed quantity to produce a third product;
    averaging the third product to produce $R_1$;
    combining an expected value $S_2$ of a product of two noise samples separated by one sampling period with $R_1$ to produce a fifth output $R'_1$; and,
    determining a resonant frequency f of a device providing the input based upon the first, second, third, fourth, and fifth outputs.

23. The method of claim 22 wherein the gyro comprises a vibrating quartz gyro.

24. The method of claim 22 wherein the gyro comprises parallel tines.

25. The method of claim 22 wherein the determining of the resonant frequency f comprises:
    determining a coefficient $\hat{a}_m$ according to the following equation:

$$\hat{a}_m = \frac{1}{D'_m}[-P'_o(m)R'_0(m) + P'_1(m)R'_1(m)];$$

determining a coefficient $\hat{b}_m$ according to the following equation:

$$\hat{b}_m = \frac{1}{D'_m}[P'_1(m)R'_0(m) - P'_2(m)R'_1(m)];$$

and, determining the resonant frequency f according to the following equation:

$$\hat{f}_m = \frac{1}{2\pi T} \cos^{-1}\left(\frac{-\hat{a}_m}{2 \cdot \sqrt{\hat{b}_m}}\right)$$

wherein $D'_m$ is given by the following equation:

$$D'_m = P'_0(m)P'_2(m) - [P'_1(m)]^2.$$

26. The method of claim 25 further comprising:
    applying the coefficient $\hat{b}_m$ to the second delayed quantity to produce a sixth output;
    subtracting the sixth output from the input to produce a seventh output;
    squaring the seventh output;
    applying a factor $K_m^2$ to the squared seventh output to produce an eighth output;
    applying the coefficient $\hat{b}_m$ to the squared first delayed quantity to produce a ninth output;
    adding the eighth and ninth outputs to produce an envelope $y_n$;
    estimating a decay parameter $\hat{c}_m$ for the envelope $y_n$; and,
    estimating a Q of the device in accordance with the following equation:

$$\hat{Q}_m = \pi \frac{\hat{f}_m}{\hat{c}_m}$$

wherein $K_m^2$ is determined in accordance with the following equation:

$$K_m^2 = \frac{\hat{b}_m}{4\hat{b}_m - \hat{a}_m^2}.$$

27. The method of claim 22 wherein the delaying of the input by two sample periods comprises delaying the first delayed quantity by one sample period to produce the second delayed quantity.

28. The method of claim 22 wherein the first sample comprises an initial sample, and wherein the second sample comprises a sample next following the initial sample.

29. A method of determining a resonant frequency of a gyro comprising:
    energizing the gyro into vibration with a short burst of energy to produce a decaying sinusoidal vibration output from the gyro;

sampling the decaying sinusoidal vibration output with a sampling period T to produce samples $x_n$;

determining coefficients a and b of a linear difference equation characterizing the decaying sinusoidal vibration output by use of a least-mean-square fit, wherein the linear difference equation has the following form:

$$x_{n+2} + bx_n = 0$$

wherein the least-mean-square fit used to estimate the coefficients a and b is in accordance with the following equation:

$$\min_{\hat{a}_m, \hat{b}_m} J_m \text{ where } J_m = \sum_{n=0}^{m} (x_{n+2} + \hat{a}_m x_{n+1} + \hat{b}_m x_n)^2$$

where $\hat{a}_m$ and $\hat{b}_m$ are LMS estimates of coefficients a and b based upon m+2 input samples, and wherein the coefficients a and b of the linear difference equation are estimated by taking a partial derivative of $J_m$ with respect to $\hat{a}_m$ and a partial derivative of $J_m$ with respect to $\hat{b}_m$, by equating both partial derivatives to zero, and by solving for the coefficients $\hat{a}_m$ and $\hat{b}_m$;

determining the resonant frequency from the coefficients $\hat{a}_m$ and $\hat{b}_m$.

30. The method of claim 29 wherein the gyro comprises a vibrating quartz gyro.

31. The method of claim 29 wherein the gyro comprises parallel tines.

32. The method of claim 29 further comprising measuring sampled noise prior to the estimation of the coefficients a and b.

33. The method of claim 29 wherein the determining of the resonant frequency comprises computing m estimates, $\hat{f}_m$, of a resonant frequency in accordance with the following equation:

$$\hat{f}_m = \frac{1}{2\pi T} \cos^{-1}\left(\frac{-\hat{a}_m}{2 \cdot \sqrt{\hat{b}_m}}\right).$$

34. The method of claim 33 further comprising measuring sampled noise prior to the determination of the coefficients a and b.

35. The method of claim 29 wherein the resonant frequency is designated f, and wherein the method further comprises:

determining an envelope of the decaying sinusoidal vibration output based on the coefficients;

forming a natural logarithm of the envelope;

extracting a decay parameter c based on a least-mean-square fit of the natural logarithm of the envelope; and, determining a Q of the device based upon the following equation:

$$Q = \pi \frac{f}{c}.$$

36. The method of claim 35 wherein the envelope of the decaying sinusoidal vibration output is given by the following equation:

$$y_{n,m} = \frac{\hat{b}_m}{4\hat{b}_m - \hat{a}_m^2}(x_n - \hat{b}_m x_{n-2})^2 + \hat{b}_m x_{n-1}^2$$

wherein $y_{n,m}$ is the $n^{th}$ sample of the envelope of the decaying sinusoidal vibration output when the $m^{th}$ set of $\hat{a}_m$ and $\hat{b}_m$ parameter estimates are used in the envelope generation, wherein $x_n$, $x_{n-1}$, and $x_{n-2}$ are samples of the decaying sinusoidal vibration output, and wherein a and b are the coefficients of the linear difference equation.

37. The method of claim 36 further comprising measuring sampled noise prior to the determination of the coefficients a and b.

38. The method of claim 36 wherein the determining of the resonant frequency comprises determining a resonant frequency f in accordance with the following equation:

$$\hat{f}_m = \frac{1}{2\pi T} \cos^{-1}\left(\frac{-\hat{a}_m}{2 \cdot \sqrt{\hat{b}_m}}\right)$$

wherein $\hat{f}_m$ is the $m^{th}$ estimate of the resonant frequency based upon m+2 consecutive input data samples used to compute $\hat{a}_m$ and $\hat{b}_m$, and wherein T is a sampling period.

39. The method of claim 38 wherein the envelope of the decaying sinusoidal vibration output is given by the following equation:

$$y_{n,m} = \frac{\hat{b}_m}{4\hat{b}_m - \hat{a}_m^2}(x_n - \hat{b}_m x_{n-2})^2 + \hat{b}_m x_{n-1}^2$$

wherein $y_{n,m}$ is the $n^{th}$ sample of the envelope of the decaying sinusoidal vibration output when the $m^{th}$ set of $\hat{a}_m$ and $\hat{b}_m$ parameter estimates are used in the envelope generation, wherein $x_n$, $x_{n-1}$, and $x_{n-2}$ are samples of the decaying sinusoidal vibration output, and wherein a and b are the coefficients of the linear difference equation.

40. The method of claim 39 further comprising measuring sampled noise prior to the determination of the coefficients a and b.

41. A method of determining a resonant frequency f of a gyro comprising:

energizing the gyro with a short burst of energy to produce a decaying sinusoidal vibration output signal from the gyro;

sampling the decaying sinusoidal vibration output signal with a sampling period T to produce samples $x_n$;

estimating coefficients a and b of the decaying sinusoidal vibration output signal from the samples $x_n$; and, determining an estimate $\hat{f}_m$ of the resonant frequency f from estimates $\hat{a}_m$ and $\hat{b}_m$ of the coefficients a and b according to the following equation:

$$\hat{f}_m = \frac{1}{2\pi T} \cos^{-1}\left(\frac{-\hat{a}_m}{2\sqrt{\hat{b}_m}}\right)$$

wherein $\hat{f}_m$ is the $m^{th}$ estimate of the resonant frequency based upon m+2 consecutive input data samples used to compute $\hat{a}_m$ and $\hat{b}_m$ and wherein T is a sampling period.

42. The method of claim 41 wherein the gyro comprises a vibrating quartz gyro.

43. The method of claim 41 wherein the gyro comprises parallel tines.

44. A method of determining a resonant frequency of a gyro comprising:

snapping the gyro into vibration with a short burst of energy to produce a decaying sinusoidal vibration output;

determining coefficients of a linear difference equation characterizing the decaying sinusoidal vibration output by use of a least-mean-square fit; and, determining the resonant frequency of the gyro from the coefficients.

45. The method of claim 44 wherein the linear difference equation is in the following form:

$$x_{n+2} + ax_{n+1} + bx_n = 0$$

wherein $x_n$, $x_{n+1}$, and $x_{n+2}$ are samples of the decaying sinusoidal vibration output, and wherein the coefficients are a and b.

46. The method of claim 45 wherein the least-mean-square fit used to determine the $m^{th}$ estimate of the coefficients a and b by $\hat{a}_m$ and $\hat{b}_m$ is in accordance with minimizing $J_m$ given by the following equation:

$$J_m = \sum_{n=0}^{m} \left(x_{n+2} + \hat{a}_m x_{n+1} + \hat{b}_m x_n\right)^2.$$

47. The method of claim 46 wherein the estimation of the coefficients comprises:

determining a partial derivative of $J_m$ with respect to $\hat{a}_m$;

determining a partial derivative of $J_m$ with respect to $\hat{b}_m$;

equating the two partial derivatives to zero; and, solving the two equations for the coefficients $\hat{a}_m$ and $\hat{b}_m$.

48. The method of claim 47 wherein the determination of the $m^{th}$ estimate of the resonant frequency comprises estimating the resonant frequency in accordance with the following equation:

$$\hat{f}_m = \frac{1}{2\pi T} \cos^{-1}\left(\frac{-\hat{a}_m}{2 \cdot \sqrt{\hat{b}_m}}\right)$$

wherein $\hat{f}_m$ is the $m^{th}$ estimate of the resonant frequency based upon m+2 consecutive input data samples used to compute $\hat{a}_m$ and $\hat{b}_m$, and wherein T is a sampling period.

49. The method of claim 44 wherein the gyro comprises a vibrating quartz gyro.

50. The method of claim 44 wherein the gyro comprises parallel tines.

* * * * *

UNITED STATES PATENT AND TRADEMARK OFFICE
CERTIFICATE OF CORRECTION

PATENT NO. : 6,691,550 B2
DATED : February 17, 2004
INVENTOR(S) : Stanley A. White It is certified that error appears in the above-identified patent and that said Letters Patent is hereby corrected as shown below:

Column 12,
Line 61, change "$X_{n+2}$" to -- -$X_{n-2}$ --.

Column 14,
Line 49, change "$D_m = P_0(m)P_2(m) = [P_1(m)]^2$" to -- $D_m = P_0(m)P_2(m) - [P_1(m)]^2$ --.

Column 17,
Line 8, change "$x_{n+2} + bx_n = 0$" to -- -$x_{n+2} + ax_{n+1} + bx_n = 0$ --.

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,691,550 B2
DATED         : February 17, 2004
INVENTOR(S)   : Stanley A. White It is certified that error appears in the above-identified patent and that said Letters Patent is hereby corrected as shown below:

Column 12,
Line 61, change "$X_{n+2}$" to -- $X_{n-2}$ --.

Column 14,
Line 49, change "$D_m = P_0(m)P_2(m) = [P_1(m)]^2$" to -- $D_m = P_0(m)P_2(m) - [P_1(m)]^2$ --.

Column 17,
Line 8, change "$x_{n+2} + bx_n = 0$" to -- $x_{n+2} + ax_{n+1} + bx_n = 0$ --.

This certificate supersedes Certificate of Correction issued September 7, 2004.

Signed and Sealed this

Twenty-sixth Day of October, 2004

JON W. DUDAS
*Director of the United States Patent and Trademark Office*